(12) United States Patent
Barsness et al.

(10) Patent No.: US 10,884,900 B2
(45) Date of Patent: *Jan. 5, 2021

(54) INTELLIGENT PROCESSING OF DISTRIBUTED BREAKPOINTS

(71) Applicant: International Business Machines Corporation, Armonk, NY (US)

(72) Inventors: Eric L. Barsness, Pine Island, MN (US); Jay S. Bryant, Rochester, MN (US); James E. Carey, Rochester, MN (US); Joseph W. Cropper, Rochester, MN (US); John M. Santosuosso, Rochester, MN (US)

(73) Assignee: International Business Machines Corporation, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 16/391,266

(22) Filed: Apr. 22, 2019

(65) Prior Publication Data

US 2019/0251014 A1    Aug. 15, 2019

Related U.S. Application Data

(63) Continuation of application No. 15/408,367, filed on Jan. 17, 2017, now Pat. No. 10,275,337.

(51) Int. Cl.
G06F 11/36    (2006.01)

(52) U.S. Cl.
CPC ...... *G06F 11/3636* (2013.01); *G06F 11/3632* (2013.01)

(58) Field of Classification Search
CPC .......... G06F 11/3636; G06F 11/3632
(Continued)

(56) References Cited

U.S. PATENT DOCUMENTS 8,671,393 B2    3/2014  Bates
8,713,539 B2    4/2014  Bates et al.
(Continued)

OTHER PUBLICATIONS

Sommer etal, "Minerva: Distributed Tracing and Debugging in Wireless Sensor Networks", [Online], 2013, pp. 1-14, [Retrieved from internet on Aug. 25, 2020], <https://dl.acm.org/doi/pdf/10.1145/2517351.2517355> (Year: 2013).*

(Continued)

*Primary Examiner* — Geoffrey R St Leger
*Assistant Examiner* — Zengpu Wei
(74) *Attorney, Agent, or Firm* — Kelsey M. Skodje

(57) ABSTRACT

A method for processing distributed breakpoints when debugging a distributed application includes establishing a breakpoint in source code of a distributed computer program and executing the distributed computer program. Thereafter, an encountering of the breakpoint is detected in one of the processes, and execution of the one of the processes halted. However, halting execution of any other of the processes is delayed for a delay period during which a list both is generated of others of the processes in which the breakpoint is encountered and also is sorted in accordance with prioritization criteria. Finally, the sorted list is presented after the lapse of the delay period, individual ones of the processes selected in the list, and execution of the selected individual ones of the processes in the sorted list halted while halting of execution of non-selected ones of the processes in the sorted list is bypassed.

16 Claims, 1 Drawing Sheet

(58) Field of Classification Search
USPC .......................................................... 717/129
See application file for complete search history.

(56) References Cited

U.S. PATENT DOCUMENTS

| | | | | |
|---|---|---|---|---|
| 8,739,163 | B2* | 5/2014 | Ceze .......................... | G06F 9/52 |
| | | | | 711/147 |
| 8,898,256 | B2* | 11/2014 | Uthe ....................... | H04L 67/10 |
| | | | | 709/219 |
| 9,043,794 | B2 | 5/2015 | Cooper et al. | |
| 9,122,793 | B2 | 9/2015 | Bragstad et al. | |
| 10,275,337 | B2 | 4/2019 | Barsness et al. | |
| 2002/0091997 | A1 | 7/2002 | Alford et al. | |
| 2006/0031371 | A1* | 2/2006 | Uthe ......................... | G06F 8/65 |
| | | | | 709/207 |
| 2006/0101405 | A1 | 5/2006 | Buschardt et al. | |
| 2007/0168994 | A1 | 7/2007 | Barsness et al. | |
| 2009/0235262 | A1 | 9/2009 | Ceze et al. | |
| 2011/0289301 | A1* | 11/2011 | Allen .................. | G06F 11/3636 |
| | | | | 712/227 |
| 2012/0131558 | A1 | 5/2012 | Bates et al. | |
| 2014/0013157 | A1* | 1/2014 | Hopkins ............ | G06F 11/2205 |
| | | | | 714/30 |

OTHER PUBLICATIONS

Otta etal, "A Method for Testing and Debugging Distributed Applications", [Online], 2001, pp. 548-551, [Retrieved from internet on Aug. 25, 2020], <https://ieeexplore.ieee.org/stamp/stamp.jsp?tp=&arnumber=938182> (Year: 2001).*

Beschastnikh etal, "Debugging Distributed Systems", [Online], 2016, pp. 91-110, [Retrieved from internet], <https://dl.acm.org/doi/pdf/10.1145/2927299.2940294> (Year: 2016).*

"5.5.2 Non-Stop Mode," Debugging with GDB: the GNU Source-Level Debugger for GDB, Version 9.9.90.2020017-git, Tenth Edition, Printed: Jan. 31, 2020, 2 pages. https://sourceware.org/gdb/onlinedocs/gdb/Non_002dStop-Mode.html#Non_002dStop-Mode.

List of IBM Patents or Patent Application Treated as Related, Signed Feb. 6, 2020, 2 pages.

Anonymous, "Method and system for toggling breakpoint automatically in debugger," IP.COM, Nov. 18, 2010.

Anonymous, "Method to enable macros debugging," IP.COM, Dec. 1, 2010.

Ashworth, et al., "Debugging and Optimizing MPI and OpenMP Applications running on CUDA . . . ," Science & Tech Facilities Council, 2013.

* cited by examiner

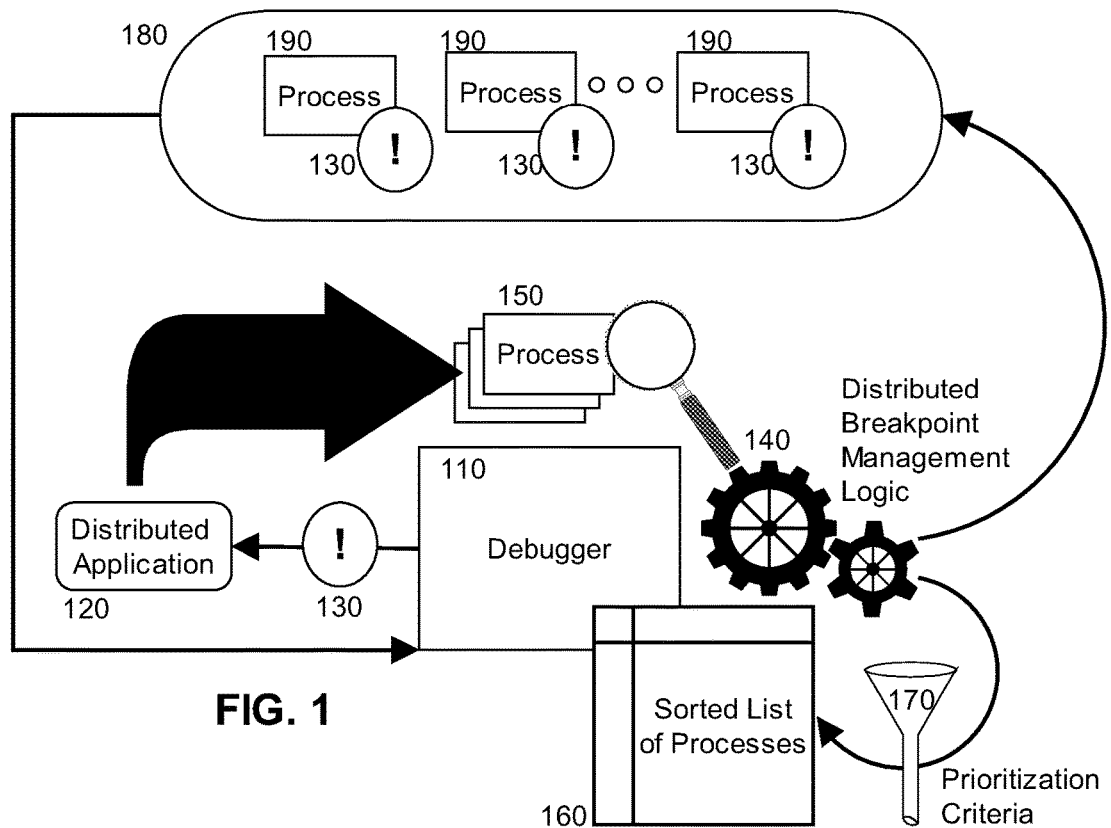
FIG. 1
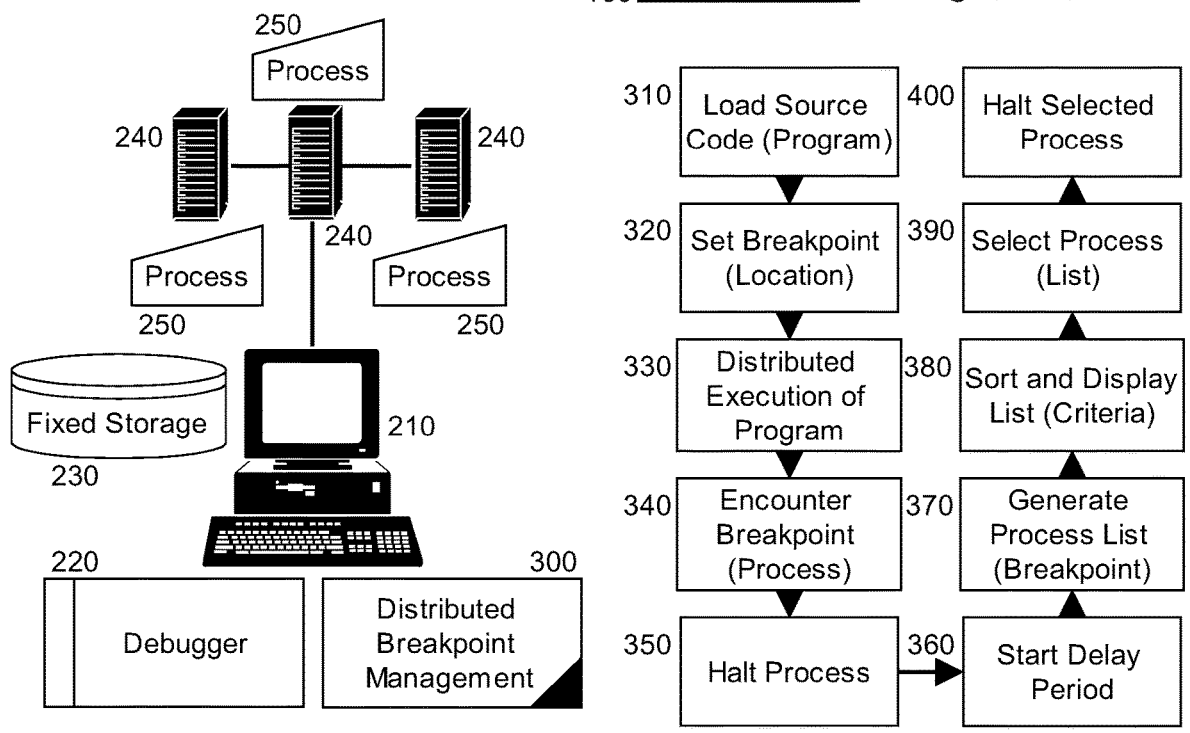
FIG. 2
FIG. 3

US 10,884,900 B2

INTELLIGENT PROCESSING OF DISTRIBUTED BREAKPOINTS

CROSS-REFERENCE TO RELATED APPLICATIONS

This application is a Continuation of U.S. patent application Ser. No. 15/408,367, filed Jan. 17, 2017, the entirety of which is incorporated herein by reference.

BACKGROUND OF THE INVENTION

Field of the Invention

The present invention relates to software debugging and more particularly to breakpoint management in debugging a distributed application.

Description of the Related Art

The art of software development extends far beyond a mere coding of a functional specification for a computer program. Modern software development conforms to a lifecycle which begins with the functional specification leading into the formulation of a suitable architecture for an application implementing the functional specification. The lifecycle continues with the physical coding of the application and includes iterative testing and debugging cycles to ensure the integrity of the code. Finally, the execution of the debugged code can be analyzed to facilitate the further revision of the code to improve the performance of the code.

The debugging process has changed little in the past decades. Generally, a debugger provided by an integrated development environment (IDE) allows the debugger to set breakpoints on lines of source code. During execution of the source code, the execution can break on each line having an established breakpoint. While the source code remains in stasis provided by the breakpoint, the debugger can inspect the values of variables and memory in general in order to determine whether or not the source code has executed as planned. As any developer will attest, the liberal use of the breakpoint during debugging is an essential aspect of the debugging process.

Of note, while the use of breakpoints in a standalone executable application is simple enough, extending the use of breakpoints to the execution of a distributed application can be problematic. In particular, a distributed application is a computer program that executes portions of the program—processes—in parallel in multiple different process address spaces and oftentimes in multiple different processors or multiple computers over a computer communications network. The different processes while executing in parallel are managed to interact with one another in order to achieve a unified goal or task of the computer program. Given the nature of a distributed application, establishing and managing the encountering of a breakpoint is not without its challenges in so far as a single established breakpoint in a distributed application may affect a massive number of parallel processes executing during a debugging session.

BRIEF SUMMARY OF THE INVENTION

Embodiments of the present invention address deficiencies of the art in respect to debugging a distributed application and provide a novel and non-obvious method, system and computer program product for processing distributed breakpoints when debugging a distributed application. In an embodiment of the invention, a method of managing distributed breakpoints when debugging a distributed application includes establishing a breakpoint in a debugger at a location in source code of a distributed computer program and executing the distributed computer program so as to cause a multiplicity of different processes of the distributed computer program to execute in different nodes in parallel.

The method also includes detecting an encountering of the breakpoint in one of the processes, and thereafter, halting executing of the one of the processes while initiating a delay period. During the delay period, a list both is generated of one or more other processes in which the breakpoint is encountered. The list is then sorted in accordance with prioritization criteria. During the delay period, however, the execution of those of the processes in which the breakpoint is encountered are not immediately halted. Rather, in response to a lapse of the delay period, the sorted list is presented in a display of the debugger, individual ones of the processes in the sorted list are selected in the display, and execution is halted only for the selected individual ones of the processes in the sorted list. But, execution of those non-selected ones of the processes in the sorted list is not halted.

In another embodiment of the invention, a software development data processing system is configured for managing distributed breakpoints when debugging a distributed application. The system includes a host computing system with one or more computers each with memory and at least one processor. The system also includes a debugger executing in the memory of the host computing system, the debugger establishing a breakpoint at a location in source code of a distributed computer program and executing the distributed computer program so as to cause a multiplicity of different processes of the distributed computer program to execute in different nodes of the host computing system in parallel. Finally, the system includes a distributed breakpoint management module coupled to the debugger.

The module includes program code enabled upon execution in the memory of the computer to detect an encountering of the breakpoint in one of the processes. The module also includes program code to halt execution of the one of the processes and initiate a delay period during which a list both is generated of others of the processes in which the breakpoint is encountered and also is sorted in accordance with prioritization criteria. Finally, the module includes program code to respond to a lapse of the delay period by presenting the sorted list in a display of the debugger, selecting individual ones of the processes in the sorted list in the display, and halting execution of the selected individual ones of the processes in the sorted list while bypassing halting of execution of non-selected ones of the processes in the sorted list.

In one aspect of either embodiment, the list is sorted based upon a comparison of variable values for each of the processes in the list. Alternatively, the list is sorted based upon a comparison of machine types hosting nodes in which the processes in the list execute. In the first aspect, the comparison of the variable values further includes an identification of ones of the variable values having a threshold deviation from a mean value for the variable values. In the first aspect, the comparison of the variable values also may further include an identification of execution times of methods in each of the processes in the list having a threshold deviation from a mean execution time for all methods of the processes. In the first aspect, the comparison of the variable values even further may include the identification of ones of different threads throwing exceptions in ones of the processes in the list that are not also throwing exceptions in others of the processes in the list.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein:

FIG. 1 is a pictorial illustration of a process for managing distributed breakpoints when debugging a distributed application;

FIG. 2 is a schematic illustration of a software development data processing system configured for managing distributed breakpoints when debugging a distributed application; and, FIG. 3 is a flow chart illustrating a process for managing distributed breakpoints when debugging a distributed application.

DETAILED DESCRIPTION OF THE INVENTION

Embodiments of the invention provide for managing distributed breakpoints when debugging a distributed application. In accordance with an embodiment of the invention, a breakpoint is established in a debugger for a location in source code of a distributed computer program. Thereafter, the distributed computer program is directed to execute until a breakpoint is reached. Upon encountering the established breakpoint in one of several executing distributed processes of the distributed computer program, a period of delay is incurred during which execution of the process in which the breakpoint is encountered ceases, and a list is compiled of all other processes during the period of delay in which the established breakpoint is encountered. The list is then sorted in accordance with a priority metric and presented in a display of the debugger. Finally, selection of breakpoints in the list is received through the display and each corresponding process is halted while other processes corresponding to unselected entries in the list are allowed to proceed. In this way, the encountering of the established breakpoint in a multiplicity of processes of the distributed computer program is intelligently managed.

In further illustration, FIG. 1 pictorially shows a process for managing distributed breakpoints when debugging a distributed application. As shown in FIG. 1, a distributed application 120 is loaded into debugger 110 and a breakpoint 130 is established for a location of source code of the distributed application 120. Subsequently, the distributed application 120 executes through the debugger 110 such that multiple different processes 150 execute in different nodes of a host computing system. Ultimately, the breakpoint 130 is encountered in one of the processes 150. In response to encountering the breakpoint 130, distributed breakpoint management logic 140 halts execution of the one of the processes 150. Thereafter, the logic 150 enters a period of delay during which the logic 140 identifies others of the processes 150 in which the same breakpoint 130 is encountered.

At the conclusion of the period of delay, the distributed breakpoint management logic 140 generates a sorted list of processes 160 for which the breakpoint 130 is encountered. In this regard, the distributed breakpoint management logic 140 orders the others of the processes 150 in the sorted list 160 based upon prioritization criteria 170. The prioritization criteria 170 may include a comparison of machine types hosting nodes in which the others of the processes 150 in the sorted list 160 execute, or a comparison of variable values for each of the others of the processes 150 in the list 160. In the latter instance, the list 160 may be sorted based upon an identification of ones of the variable values having a threshold deviation from a mean value for the variable values, or an identification of execution times of methods in each of the others of the processes 150 in the list 160 having a threshold deviation from a mean execution time for all methods of the others of the processes 150, or the identification of ones of different threads throwing exceptions in ones of the others of the processes 150 in the list 160 that are not also throwing exceptions in others of the processes 150 in the list 160.

Thereafter, the distributed breakpoint management logic 140 presents the sorted list 160 in a display of the debugger 110 in which one or more of the others of the processes 150 in the sorted list 160 may be selected. A selection 180 of the others of the processes 150 in which the breakpoint 130 has been encountered results and the processes 190 of the selection 180 are then halted from execution. However, the others of the processes 150 not selected in the display of the sorted list 160 are permitted to continue executing.

The process described in connection with FIG. 1 may be implemented in a software development data processing system. In yet further illustration, FIG. 2 schematically illustrates a software development data processing system configured for managing distributed breakpoints when debugging a distributed application. The system includes a host computing system 210 that includes one or more computers each with memory and at least one processor. The host computing system 210 also includes different computing nodes 240 communicatively coupled to one another over a computer communications network. Each of the different computing nodes 240 may include a separate computing system, or just a processor within an encapsulating computing system.

A debugger 220 executes in the host computing system 210. The debugger 220 is configured to debug a distributed computer program disposed in fixed storage 230 by establishing at least one breakpoint at a location in source code of the distributed computer program. A distributed breakpoint management module 300 additionally is coupled to the debugger 220 and includes program code that executes in the memory of the host computing system. Upon execution, the program code detects an encountering of the breakpoint in one of several processes 250 executing in one of the nodes 240 as part of the distributed application. The module also includes program code to halt execution of the one of the processes 250 and enter delay period.

During the delay period, the program code of the module 300 generates a list of others of the processes 250 in which the breakpoint is encountered and sorts the list in accordance with prioritization criteria. Finally, the program code of the module 300 responds to a lapse of the duration of time by presenting the sorted list in a display of the debugger 220, selects individual ones of the processes 250 in the sorted list in the display, and halts execution of the selected individual ones of the processes 250 in the sorted list while bypassing halting of execution of non-selected ones of the processes 250 in the sorted list.

In even yet further illustration of the operation of the module 300, FIG. 3 is a flow chart illustrating a process for managing distributed breakpoints when debugging a distributed application. Beginning in block 310, source code is loaded for a distributed computer program. In block 320, a breakpoint is established for a particular location in the source code and in block 330, the distributed computer program is executed by the debugger such that different processes of the distributed computer program execute in different nodes of a distributed computing system. In block 340, the breakpoint is encountered in one of the processes.

In response to encountering the breakpoint, in block 350 the corresponding one of the processes halts its execution and in block 360, a delay period begins. During the delay period, in block 370 a process list is generated for different ones of the processes in the nodes that also have encountered the same breakpoint. The list is then sorted according to prioritization criteria in block 380 and displayed in a selectable list in the debugger. In block 390, one or more of the processes in the list are selected. Finally, in block 400, execution halts for only the selected ones of the processes in the list while the remaining processes are permitted to continue to execute despite having encountered the breakpoint.

The present invention may be embodied within a system, a method, a computer program product or any combination thereof. The computer program product may include a computer readable storage medium or media having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing.

A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Finally, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims as follows:

We claim:

1. A method of managing distributed breakpoints when debugging a distributed application, the method comprising:
   establishing a breakpoint in a debugger at a location in source code of a distributed computer program;
   executing the distributed computer program so as to cause a multiplicity of different processes of the distributed computer program to execute in parallel;
   detecting an encountering of the breakpoint in one of the processes;
   halting executing of the one of the processes and initiating a delay period during which a list both is generated of others of the processes in which the breakpoint is encountered and also is sorted in accordance with prioritization criteria, wherein the list is sorted based upon a comparison of variable values for each of the processes in the list; and,
   responsive to a lapse of the delay period, presenting the sorted list in a display of the debugger for selection, and responsive to the selection of individual ones of the processes in the sorted list in the display, halting execution of the selected individual ones of the processes in the sorted list while bypassing halting of execution of non-selected ones of the processes in the sorted list.

2. The method of claim 1, wherein the list is sorted based upon a comparison of machine types hosting nodes in which the processes in the list execute.

3. The method of claim 1, wherein the comparison of the variable values further comprises an identification of ones of the variable values having a threshold deviation from a mean value for the variable values.

4. The method of claim 1, wherein the comparison of the variable values further comprises an identification of execution times of methods in each of the processes in the list having a threshold deviation from a mean execution time for all methods of the processes.

5. The method of claim 1, wherein the comparison of the variable values is the identification of ones of different threads throwing exceptions in ones of the processes in the list that are not also throwing exceptions in others of the processes in the list.

6. A software development data processing system configured for managing distributed breakpoints when debugging a distributed application, the system comprising:
   a host computing system comprising one or more computers each with memory and at least one processor;
   a debugger executing in the memory of the host computing system, the debugger establishing a breakpoint at a location in source code of a distributed computer program and executing the distributed computer program so as to cause a multiplicity of different processes of the distributed computer program to execute in different nodes of the host computing system in parallel; and,
   a distributed breakpoint management module coupled to the debugger, the module comprising program code enabled upon execution in the memory of the computer to detect an encountering of the breakpoint in one of the processes, to halt execution of the one of the processes and initiating a delay period during which a list both is generated of others of the processes in which the breakpoint is encountered and also is sorted in accordance with prioritization criteria, wherein the list is sorted based upon a comparison of variable values for each of the processes in the list, and to respond to a lapse of the delay period, presenting the sorted list in a display of the debugger for selection, and to respond to the selection of individual ones of the processes in the sorted list in the display, halting execution of the selected individual ones of the processes in the sorted list while bypassing halting of execution of non-selected ones of the processes in the sorted list.

7. The system of claim 6, wherein the list is sorted based upon a comparison of machine types hosting nodes in which the processes in the list execute.

8. The system of claim 6, wherein the comparison of the variable values further comprises an identification of ones of the variable values having a threshold deviation from a mean value for the variable values.

9. The system of claim 6, wherein the comparison of the variable values further comprises an identification of execution times of methods in each of the processes in the list having a threshold deviation from a mean execution time for all methods of the processes.

10. The system of claim 6, wherein the comparison of the variable values is the identification of ones of different threads throwing exceptions in ones of the processes in the list that are not also throwing exceptions in others of the processes in the list.

11. A computer program product for managing distributed breakpoints when debugging a distributed application, the computer program product comprising a computer readable storage medium having program instructions embodied therewith, the program instructions executable by a device to cause the device to perform a method comprising:
  establishing a breakpoint in a debugger at a location in source code of a distributed computer program;
  executing the distributed computer program so as to cause a multiplicity of different processes of the distributed computer program to execute in different nodes in parallel;
  detecting an encountering of the breakpoint in one of the processes;
  halting executing of the one of the processes and initiating a delay period during which a list both is generated of others of the processes in which the breakpoint is encountered and also is sorted in accordance with prioritization criteria, wherein the list is sorted based upon a comparison of variable values for each of the processes in the list; and,
  responsive to a lapse of the delay period, presenting the sorted list in a display of the debugger for selection, and responsive to the selection of individual ones of the processes in the sorted list in the display, halting execution of the selected individual ones of the processes in the sorted list while bypassing halting of execution of non-selected ones of the processes in the sorted list.

12. The computer program product of claim 11, wherein the list is sorted based upon a comparison of variable values for each of the processes in the list.

13. The computer program product of claim 11, wherein the list is sorted based upon a comparison of machine types hosting nodes in which the processes in the list execute.

14. The computer program product of claim 11, wherein the comparison of the variable values further comprises an identification of ones of the variable values having a threshold deviation from a mean value for the variable values.

15. The computer program product of claim 11, wherein the comparison of the variable values further comprises an identification of execution times of methods in each of the processes in the list having a threshold deviation from a mean execution time for all methods of the processes.

16. The computer program product of claim 11, wherein the comparison of the variable values is the identification of ones of different threads throwing exceptions in ones of the processes in the list that are not also throwing exceptions in others of the processes in the list.

* * * * *